United States Patent [19]

Bergman et al.

[11] Patent Number: 4,524,358

[45] Date of Patent: Jun. 18, 1985

[54] PULSE RADAR APPARATUS

[75] Inventors: Jan Bergman; Pieter Van Genderen, both of Haaksbergen; Willem A. Hol, Hengelo, all of Netherlands

[73] Assignee: Hollandse Signaalapparaten B.V., Hengelo, Netherlands

[21] Appl. No.: 353,693

[22] Filed: Mar. 1, 1982

[30] Foreign Application Priority Data

Mar. 9, 1981 [NL] Netherlands ............... 8101111

[51] Int. Cl.³ .................. G01S 13/52; G01S 7/28
[52] U.S. Cl. .................... 343/7.7; 343/5 FT; 343/5 DP; 343/17.1 R
[58] Field of Search ........... 343/5 FT, 5 SA, 5 VQ, 343/7.7, 17.1 R, 5 DP

[56] References Cited

U.S. PATENT DOCUMENTS

| 3,680,096 | 7/1972 | Bosc ..................... 343/7.7 |
| 4,104,631 | 8/1978 | Weigle et al. ........... 343/7 A |
| 4,106,019 | 8/1978 | Alexander et al. ....... 343/9 |
| 4,225,864 | 9/1980 | Lillington ............ 343/5 NQ X |

FOREIGN PATENT DOCUMENTS 2306453  4/1976  France .
103690   8/1979  Japan ..................... 343/7.7

OTHER PUBLICATIONS

J. D. Grimm et al., "Radar Signal Processing Technology", May 1978, pp. 1–11, IEEE Electro/78 Conf. Record, 28/2, presented at Electro/78 Boston (USA).

C. E. Muehe et al., "The Parallel Microprogrammed Processor", Oct. 25–28, 1977, pp. 97–100, Radar, London, England.

C. E. Muehe, "Moving Target Detector, An Improved Signal Processor", Jun. 14–17, 1976, pp. 14-1–14-10, Conference: AGARD Conference Proceedings.

Primary Examiner—T. H. Tubbesing
Assistant Examiner—Gilberto Barrón, Jr.
Attorney, Agent, or Firm—Robert J. Kraus

[57] ABSTRACT

In a pulse radar apparatus target returns are detected, sampled, digitized per range quant and frequency analyzed. The apparatus includes a cell classification unit (5) for deriving from the spectrum of the target returns a cell classification signal, whose logical values indicate whether the target returns within a radar cell are classified to be from a moving target or from a fixed target. In a microprocessor (15) the cells, which cluster, while a signal represenmtative of the target covered by the collectively cover one single target, are combined to form a cluster is determined. In the microprocessor (15) a cluster classification signal is derived, whose logical values indicate whether the target returns within the cluster are classified to be from a moving target or from a fixed target. The signal representative of the target covered by the cluster is read out if it is derived from target returns classified to be from moving targets.

2 Claims, 3 Drawing Figures

PULSE RADAR APPARATUS

BACKGROUND OF THE INVENTION

The invention relates to a pulse radar apparatus comprising a transmitter and receiver, whereby the target returns—after detection—are sampled and digitised per range quant. An n-point FFT processing unit and a threshold circuit are provided for determining a threshold value for each of the n frequency output channels of the FFT processing unit, above which threshold value the output signals of the FFT processing unit are passed.

The FFT processing unit converts the video data, sampled and digitised per range quant, from n successive radar scans into n output signals situated in adjoining frequency bands. Such a conversion is hereinafter referred to as an FFT scan. A division of the radar range into radar cells formed by range quants and azimuth sectors determined by n successive azimuth scans then corresponds with a division into FFT cells formed by FFT scans and range quants. For the successive FFT scans the corresponding azimuth sectors may overlap each other partly; hence, in such a case the radar cells of these azimuth sectors will also overlap each other. The output signals of the FFT processing unit determine the spectrum of the target returns processed per radar cell. This spectrum will of course differ for fixed and moving targets, where the fixed targets include targets having a small radial velocity component. With the radar beam moving over the target, the principal frequency components from the spectrum of the returns of fixed targets, for successive radar cells in a range bin, differ mutually in the sense that with the use of a single canceller in the receiver of the pulse radar apparatus the frequency components will be of minimum value at the instant the beam is directed at the target centre and will increase in value as the beam is directed away from the centre. This effect is less pronounced with the use of a double canceller. The spectra of the returns from moving targets, for successive radar cells in a range bin, may differ in the sense that the frequency components will be of maximum value at the instant the beam is directed at the target centre and will decrease in value as the beam is directed away from the centre. Because of these effects, the decision regarding whether target returns are from clutter or from targets having a velocity that corresponds with a frequency in the order of k.prf (k=0, 1, 2, ...) may differ, depending how closely the radar beam is directed at the target center. If the range quants are selected smaller than the length of the target returns, several successive digitised samples will be obtained from such returns. Because of the random noise present, the distinction between clutter and moving targets in the cells succeeding each other in range may in general come out differently as well.

SUMMARY OF THE INVENTION

The present invention has for its object to provide a pulse radar apparatus, as set forth in the opening paragraph, such that on account of a spectrum analysis performed in the FFT processing unit a proper distinction between fixed targets, including clutter, and moving targets can be made.

According to the invention, a cell classification unit, connected to the threshold circuit, is provided for deriving from the spectrum of the target returns processed per radar cell a cell classification signal (FQ), whose logical values indicate whether the target returns within such a cell are classified, in the first instance, to be from a moving target or from a fixed target. The cell classification unit comprises a circuit for deriving, from the frequency output signals delivered by the FFT processing unit per cell, the signals $S_{0,1}$ and $S_{0,n-1'}$ whose logical values indicate whether the amplitude of the output signal ($A_0$), delivered via the frequency output channel 0, is greater or smaller than the amplitude of the output signal ($A_1$), delivered via the frequency output channel 1, and greater or smaller than the amplitude of the output signal ($A_{n-1}$) delivered via the frequency output channel n−1; and a logical circuit for producing the cell classification signal $FQ = S_{0,1} \cdot S_{0,n-1}$ upon the supply of the signals $S_{0,1}$ and $S_{0,n-1}$. A microprocessor, which is also provided, comprises means for combining the cells which collectively cover one single target, to form a cluster and for determining a signal representative of the target covered by the cluster; means for deriving, from the cell classification signals of the cluster cells, a cluster classification signal (CLUC), whose logical values indicate that the target returns within the cluster are classified to be from a moving target or from a fixed target; and means for reading the signal representative of the target covered by the cluster out of the microprocessor with the use of the cluster classification signal, in so far as the read-out signal is derived from target returns classified to be from moving targets.

Hence, from the spectrum defined for one cell a preliminary indication of a fixed/moving target is obtained, while from the preliminary indications, established for the cells of a cluster, a final decision on a fixed-moving target can be made.

BRIEF DESCRIPTION OF THE DRAWING

The invention will now be described with reference to the accompanying figures, of which:

FIGS. 2A and 2B are diagrams explaining the functions fulfilled by the microprocessor.

DESCRIPTION OF THE PREFERRED EMBODIMENT

Figure 1:
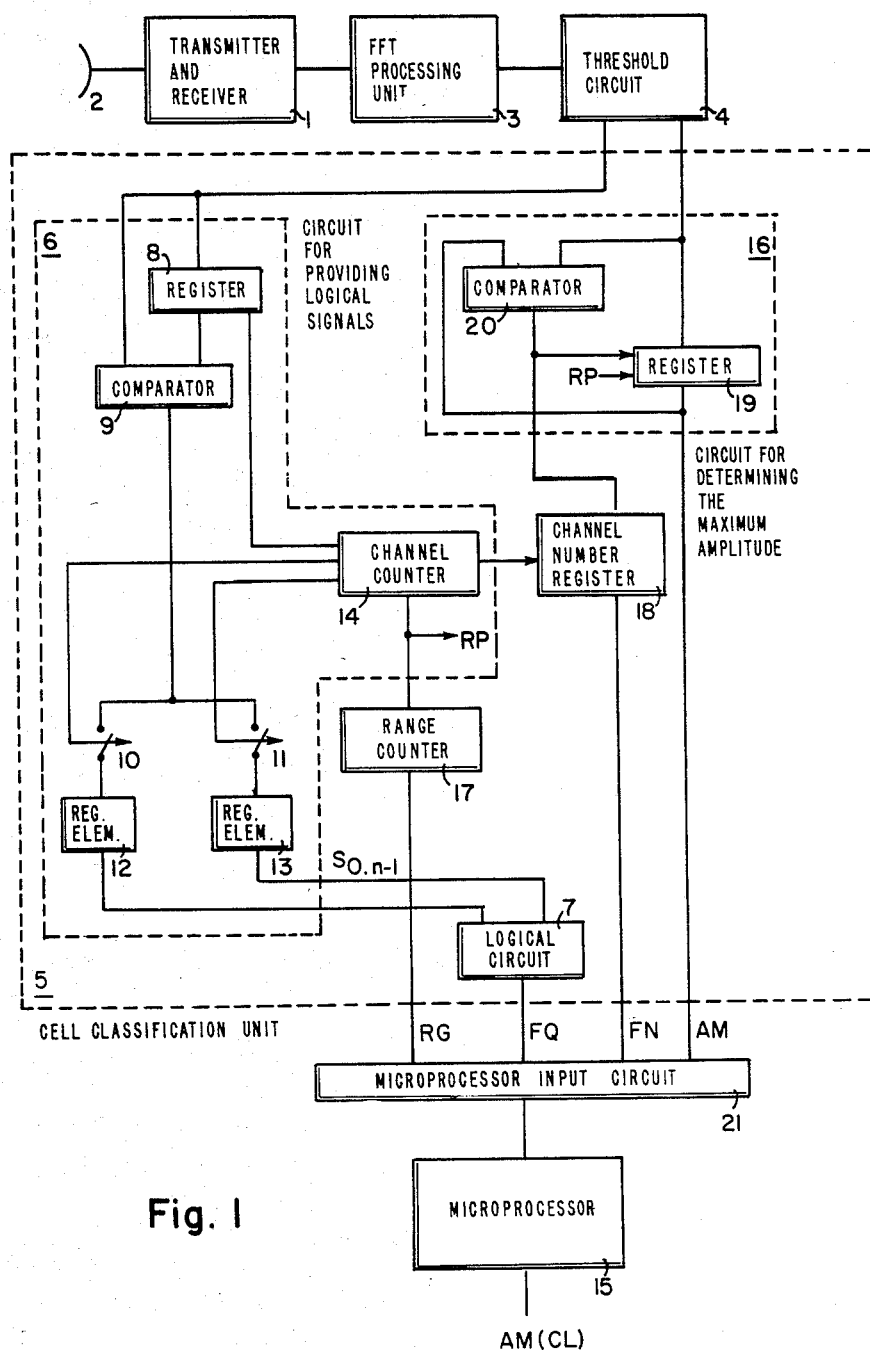
FIG. 1 is a block diagram of the pulse radar apparatus according to the invention.

The pulse radar apparatus depicted in FIG. 1 comprises a pulse radar transmitter and receiver 1, an antenna 2, an FFT processing unit 3, and a threshold circuit 4. In the pulse radar transmitter and receiver 1 the target returns are, after detection, sampled and digitised per range quant. The digitised video signals thus obtained are passed first through a digital MTI canceller, forming part of the transmitter and receiver 1, to reduce the strength of returns from fixed targets, and then applied to the FFT processing unit 3. The FFT processing unit 3 converts the video data, supplied from n successive radar scans and situated in one range bin, into n output signals in the n frequency output channels of the FFT processing unit. If the video data from radar scans 1, 2, ..., n for all appropriate range quants is converted into frequency data, the video data from radar scans n−k+1, n−k+2, ..., 2n−k is converted into frequency data. Here k may assume the values 0, 1, 2, ... n−1. The successive FFT scans thus correspond with adjoining or more or less overlapping azimuth sectors. With each FFT scan and each range quant the FFT processing unit 3 supplies the threshold circuit 4 with n digital words, namely the amplitudes of n frequency values from the video spectrum. For each of these frequency values, i.e. for each of the frequency output channels of the FFT processing unit 3, a threshold is established. The frequency values exceeding this threshold are passed. In general the threshold for the centre frequency output channels will be greater than that for the extreme frequency channels; this is mainly due to the canceller effect in the pulse radar transmitter and receiver 1.

The signals of amplitudes $A_i$ (i=0, 1, 2, ..., n−1), delivered by the FFT processing unit and passed through the threshold circuit 4, are supplied to a cell classification unit 5 to derive, from the spectrum of the target returns processed per radar cell, a cell classification signal FQ, whose logical values indicate that the target returns within such a cell are classified, in the first instance, to be from a moving target or from a fixed target. The cell classification circuit 5 comprises a circuit 6 for deriving, from the frequency output signals delivered by the FFT processing unit per cell, the signals $S_{0,1}$ and $S_{0,n-1}$, whose logical values indicate whether the amplitude of the output signal $A_0$, delivered via the frequency output channel 0, is greater or smaller than the amplitude of the output signal $A_1$, delivered via the frequency output channel 1, and greater or smaller than the amplitude of the output signal $A_{n-1}$ delivered via the frequency output channel n−1; and a logical circuit 7 for producting the cell classification signal $FQ = S_{0,1} \cdot S_{0,n-1}$ upon the supply of the signals $S_{0,1}$ and $S_{0,n-1}$.

Circuit 6 consists of a register 8, a comparator 9, two switches 10 and 11, two register elements 12 and 13, and a channel counter 14. Channel counter 14 counts the number of frequency output channels of the FFT processing unit, and stores in register 8 the amplitude of the output signal $A_0$ delivered via the frequency output channel 0. In comparator 9 the output signal $A_0$ is compared with the successive amplitudes of the output signals $A_1, A_2, \ldots, A_{n-1}$, delivered via the frequency output channels 1, 2, ..., n−1. However, only the results of the comparison of $A_0$ with $A_1$ and with $A_{n-1}$ are stored. At the instants established by the channel counter 14 the result of the comparison of $A_0$ with $A_1$ is stored in register element 12 via switch 10 and the result of the comparison of $A_0$ with $A_{n-1}$ in register element 13 via switch 11. The output signal $S_{0,1}$ of register element 12 is "1" if $A_0 > A_1$ and "0" if $A_0 < A_1$; the output signal $S_{0,n-1}$ of register element 13 is "1" if $A_0 > A_{n-1}$ and "0" if $A_0 < A_{n-1}$.

Signals $S_{0,1}$ and $S_{0,n-1}$ are subsequently fed to the logical circuit 7 to determine the cell classification signal $F_Q = S_{0,1} \cdot S_{0,n-1}$. In the case of a preliminary "fixed target" classification, FQ="1" and in the case of a preliminary "moving target" classification, FQ="0". So, the spectrum of the target return in each radar cell provides a preliminary indication of the target return regarded to be from a moving target or from a fixed target. As set forth in the introductory part, a definite indication thereof is obtained from the preliminary indications established for the cells of a cluster. The pulse radar apparatus depicted in FIG. 1 is provided with a microprocessor 15, comprising:

a. means for combining the cells together covering one single target to form a cluster and for determining a signal representative of the target covered by the cluster;

b. means for deriving, from the cell classification signals of the cluster cells, a cluster classification signal CLUC, whose logical values indicate whether the target returns within the cluster are classified to be from a moving target or from a fixed target; and c. means for reading the signal representative of the target covered by the cluster out of the microprocessor, in so far as the read-out signal is derived from target returns classified to be from moving targets.

In order that the microprocessor be able to fulfil the above-described functions, the following additional signals are required:

a. a signal RG to indicate the range of the radar cell for which the video data are processed in the cell classification unit;

b. a signal AM to indicate the maximum amplitude established in each cell from the frequency output signals of the FFT processing unit;

c. a signal FN to indicate the number of the frequency output channel in which the maximum amplitude has been established.

In the embodiment in question the above additional signals are derived in the cell classification unit 5. This is accomplished by a circuit 16 for determining the maximum amplitude AM of the frequency output signals, which output signals are delivered by the FFT processing unit 3 and are in excess of the threshold values established for the respective frequency output channels; the channel counter 14; a range counter 17; and a channel number register 18.

Circuit 16 consists of a register 19 and a comparator 20. Register 19 receives the amplitude $A_i$ only when the comparator 20 establishes that $A_i$ is greater than the amplitude value already contained in register 19. The range pulse RP is used to determine the maximum amplitude AM in register 19 for each FFT scan and each range quant and to retain this value until the determination of the maximum amplitude for the next range quant of the FFT scan. Channel counter 14 is triggered with each FFT scan to count the number of frequency output channels of the FFT processing unit; after each count the range count pulse RP is produced and the range counter 17 is incremented. The channel counter 14 also ensures that the channel number FN producing the maximum amplitude at the instant determined by comparator 20 is entered in the channel number register 18. The FQ, RG, FN and AM signals are supplied to microprocessor 15 via the microprocessor input circuit 21.

Figure 2B:
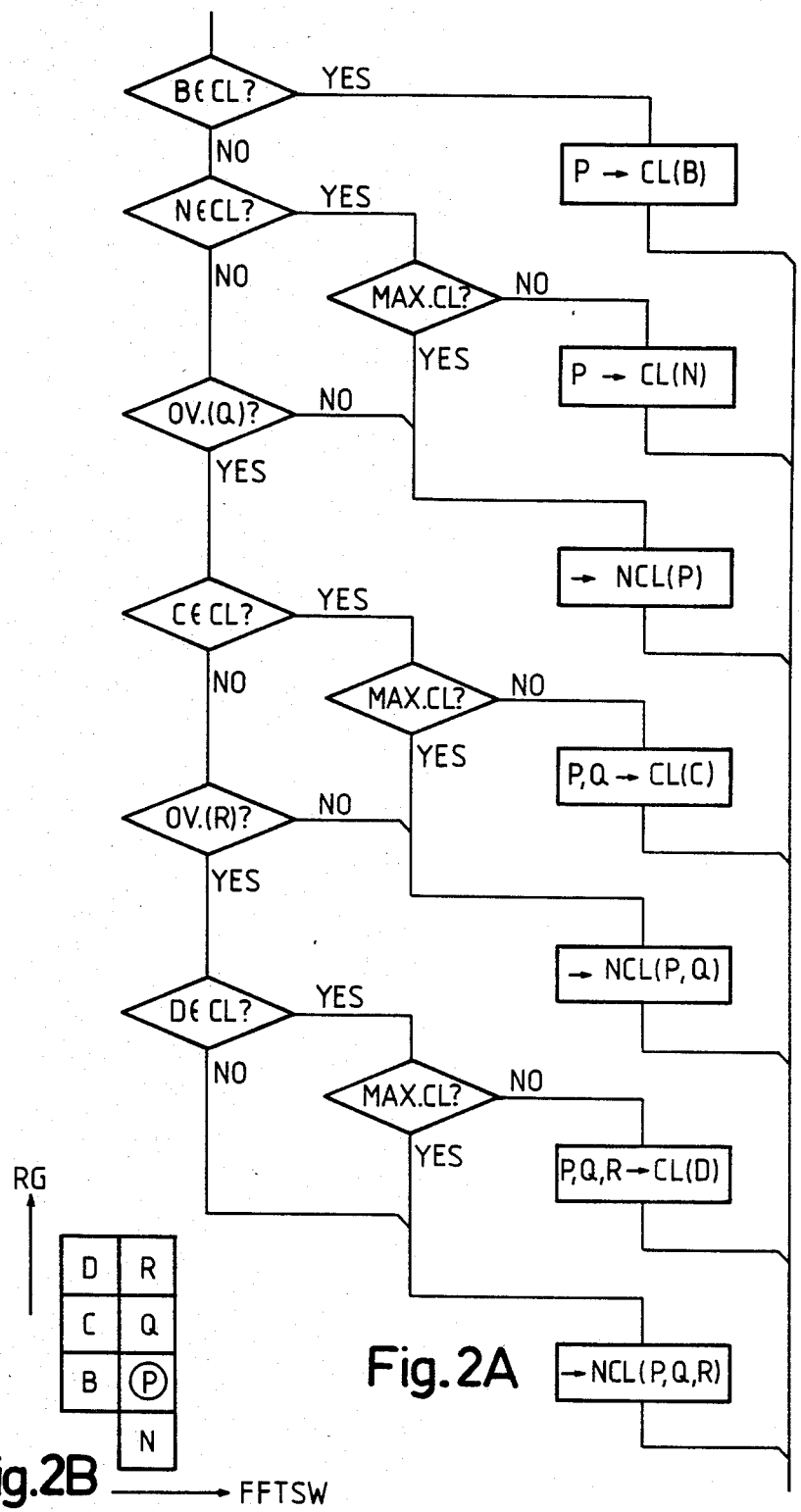
Figure 2B:
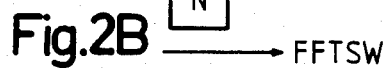

The microprocessor first combines the cells covering one single target to form a cluster and determines a signal representative of the target covered by the cluster. The computing process here employed is illustrated by the flow diagram of FIG. 2A. The diagram of FIG. 2B explains the use of this flow diagram. FIG. 2B shows a number of radar cells B, C, D, N, P, Q and R for several successive range quants (RG) and FFT scans (FFTSW). In case of adjoining cells of excess amplitudes in one or several frequency channels, these cells are combined to form clusters. If in an FFT scan no cells are added to a cluster or if the maximum cluster extent is reached, the cluster is isolated to perform the cluster classification. A cluster may extend over a certain maximum number of FFT scans, for example 7; if, after reaching the maximum width of a cluster, adjoining cells of excess amplitudes are detected, these cells must be added to a new cluster. Therefore, for each cluster the count of the FFT scan counter must be updated, while the cluster is not to extend beyond a certain maximum number of range quants, for example 4. This is accomplished by counting the number of cells added during an FFT scan and storing this number of the preceding FFT scan. In building up a cluster, the data of the preceding and the current FFT scan is used. Suppose that in cell P in FIG. 2B an excess amplitude has occurred in one of the frequency channels. If cell B belonged to a cluster (B ∈ CL), then cell P is added to this cluster (P→CL(B)). If cell B did not belong to a cluster (B ∉ CL), but cell N did (N ∈ CL), cell P may be added to the cluster of N (P→CL(N)), provided the cluster has not reached its maximum range ($\overline{MAX.CL}$). If the cluster has however reached the maximum value or if N did not belong to a cluster (N ∉ CL) and no excess amplitude has been detected ($\overline{OV(Q)}$) in cell Q, a new cluster will be produced and will include cell P (→NCL(P)). If an excess amplitude has occurred in cell Q (OV(Q)) and in cell C as well, cells P and Q are added to the cluster of C (P,Q→CL(C)), provided the cluster has not reached its maximum range ($\overline{MAX.CL}$). The process shown in the flow diagram continues until either cell P and possibly cells Q, R are added to an existing cluster (P→CL(B), P→CL(N), P,Q→CL(C) and P,Q,R→CL(D)), or new clusters are generated, of which P and possibly Q, R form a part (→NCL(P), →NCL(P,Q) and →NCL(P,Q,R)).

Amplitudes AM(i), where i=1, 2, ..., k, of k cells belonging to the cluster thus produced are compared in the microprocessor; the maximum value serving as the amplitude for the cluster AM(CL). This signal, which is representative of the target covered by the cluster, can be read out by the microprocessor, in so far as it is derived from target returns classified to be from moving targets.

The value of the output signal of channel number register 18, belonging to the cell of which the amplitude determined therein is classified as the amplitude for the cluster, is regarded to be the FN value for the cluster and is indicated by FN(CL). Similarly, the value of the output signal of the logical circuit 7, belonging to the cell of the cluster having the maximum AM value, is regarded to be the FQ value for the cluster and is indicated by FQ(CL).

If FN(CL)=n−2, n−1, 0, 1 or 2 and FQ(CL)=1, the cluster classification signal CLUC will be "0" and signal AM(CL), as being from a fixed target, will be suppressed, i.e. it will not be read out by the microprocessor. In all other cases CLUC=1, and signal AM(CL), as being from a moving target, will be read out by the microprocessor.

We claim:

1. In a pulse radar apparatus comprising a transmitter for transmitting radar pulses, a receiver for detecting, sampling and digitizing target returns for a plurality of range quants, an n-point FFT processing unit coupled to the receiver and having n output channels for producing respective output signals $A_0, A_1 \ldots A_{n-1}$ representing the target returns for n successive radar scans, and a threshold circuit coupled to said output channels for passing the output signals having magnitudes larger than predefined threshold magnitudes for the respective channels, the improvement comprising means for distinguishing between stationary targets and moving targets, including:

(a) a cell classification unit, coupled to the threshold circuit, for producing from the output signals passed a cell classification signal FQ having successive logical values preliminarily indicating whether target returns from respective radar cells represent moving or stationary targets, said cell classification unit comprising:
(1) circuitry for producing a signal $S_{0,1}$ indicating whether the output signal $A_0$ is larger or smaller than the output signal $A_1$,
(2) circuitry for producing a signal $S_{0,n-1}$ indicating whether the output signal $A_0$ is larger or smaller than the output signal $A_{n-1}$, and
(3) circuitry for producing the cell classification signal $FQ = S_{0,1} \cdot S_{0,n-1}$; and (b) a processor means, coupled to the cell classification unit, for:
(1) associating adjacent radar cells, which collectively cover a target, to form a cell cluster,
(2) producing from the cell classification signals for said associated cells a cluster classification signal (CLUC) indicating whether the target covered by the cluster is moving or stationary, and
(3) responding to the cluster classification signal (CLUC) by producing a signal representative of the target covered by the cluster, if it is a moving target.

2. A pulse radar apparatus as in claim 1 where:
(a) said cell classification unit includes means for determining, for each cell, a value AM representing the maximum amplitude output signal for said cell, and means for determining for each cell a value FN identifying which output channel produced said maximum amplitude output signal; and
(b) said processor means comprises means for determining from the values AM for each cell cluster the maximum value AM(CL), and for determining from the values FN for each cell cluster the value FN(CL) identifying the output channel which produced the output signal having the amplitude represented by the maximum value AM(CL);
said cluster classification signal (CLUC) indicating that the target covered by the respective cluster is stationary if FQ(CL)=1 and FN(CL)=n−2, n−1, 0, 1 or 2; and
said cluster classification signal (CLUC) indicating that the target covered by the respective cluster is moving, for all other combinations of values of FQ(CL) and FN(CL).

* * * * *